United States Patent [19]

Freundlich

[11] Patent Number: 4,602,128
[45] Date of Patent: Jul. 22, 1986

[54] AUTOMATIC REDIALING ARRANGEMENT FOR MULTI-LINE TELEPHONE STATION SETS

[75] Inventor: Glen G. Freundlich, Westminster, Colo.

[73] Assignee: AT&T Information Systems Inc., Holmdel, N.J.

[21] Appl. No.: 676,257

[22] Filed: Nov. 29, 1984

[51] Int. Cl.⁴ .................. H04M 1/274; H04M 15/26
[52] U.S. Cl. ............................... 179/10; 179/18 BA; 179/90 BD; 179/90 B
[58] Field of Search ............... 179/10, 90 BB, 18 BA, 179/90 BD, 90 B; 340/825.13, 825.12

[56] References Cited

U.S. PATENT DOCUMENTS

| | | | |
|---|---|---|---|
| 4,232,200 | 11/1980 | Hestad et al. | 179/90 K |
| 4,243,845 | 1/1981 | Feinberg et al. | 179/90 B |
| 4,324,954 | 4/1982 | Taylor | 179/90 B |
| 4,482,786 | 11/1984 | Flynn | 179/90 BD X |
| 4,485,274 | 11/1984 | Jordon et al. | 179/90 BD |

*Primary Examiner*—Stafford D. Schreyer
*Attorney, Agent, or Firm*—James M. Graziano

[57] ABSTRACT

The subject arrangement provides a last number dialed automatic redialing capability for each line of a multi-line telephone station set or attendant console. This is accomplished by maintaining a centralized last number dialed table on a per-line basis in the telephone switching system processor. When a subscriber subsequently accesses a line and operates the REDIAL key on the station set, the system processor retrieves the stored last number dialed for that line and completes a call connection to the identified destination.

18 Claims, 2 Drawing Figures

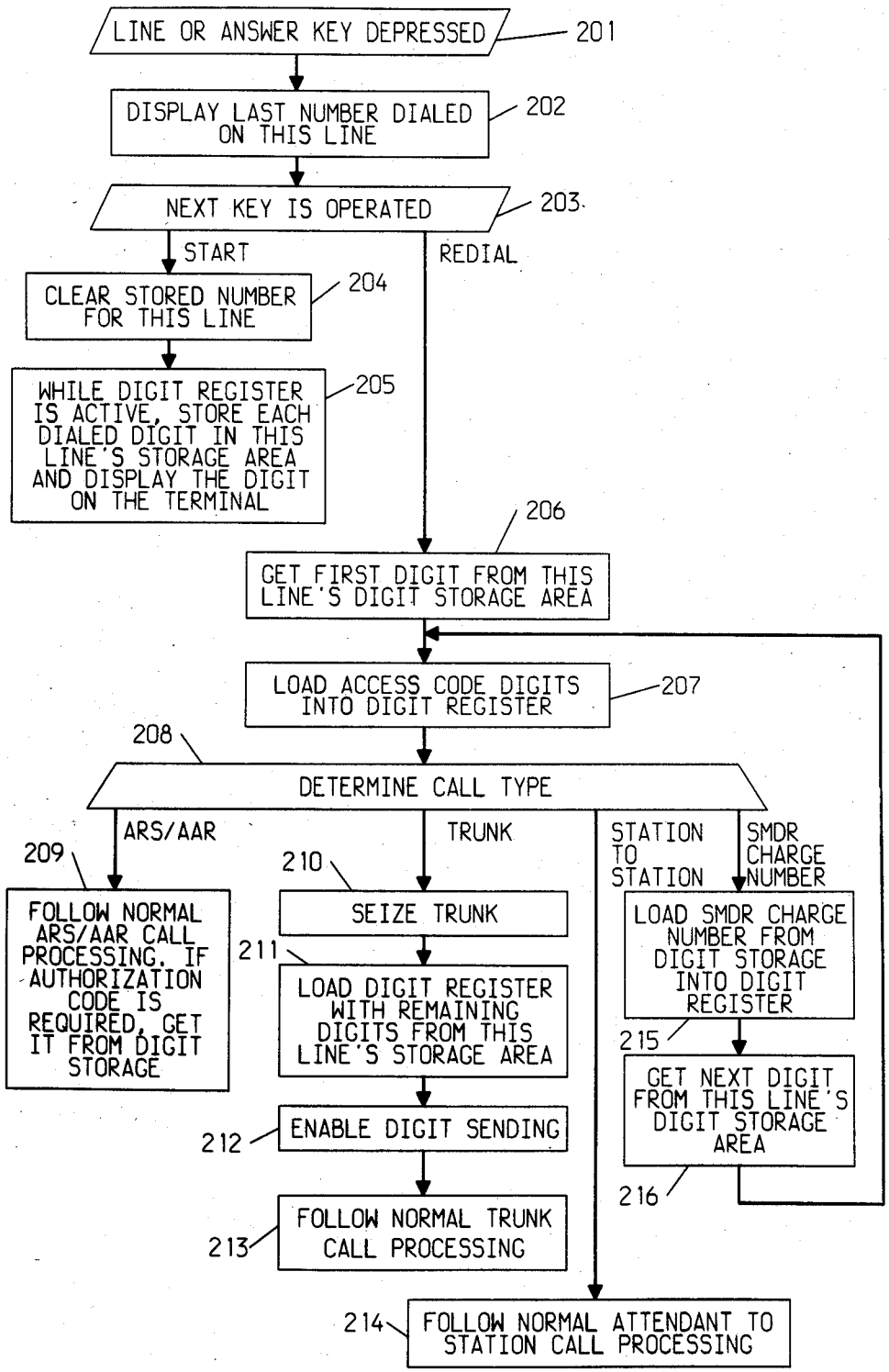

AUTOMATIC REDIALING ARRANGEMENT FOR MULTI-LINE TELEPHONE STATION SETS

FIELD OF THE INVENTION

This invention relates to telephone switching systems and, in particular, to an arrangement which provides an automatic redialing capability for each line of a multi-line telephone station set. The telephone switching system accomplishes this by maintaining a table in the system processor memory, which table contains entries to indicate the last number dialed on each line in the telephone switching system.

BACKGROUND OF THE INVENTION

Automatic redialing arrangements are common in telephone station sets. These arrangements are all available on a per station set basis where the station set is equipped with a shift register memory to store the last set of digits dialed on the station set touch-tone key pad. For a multi-line station set, this memory stores the last number dialed regardless of which line the subscriber has accessed. If a subscriber successively accesses different lines to place different calls, the only number available to the subscriber for automatic redialing is the last number dialed on the telephone station set touch-tone key pad. This is especially disadvantageous in a case of an attendant console where the attendant must maintain a handwritten record of the last number dialed on each one of the console loop appearances.

SUMMARY OF THE INVENTION

The subject automatic redialing arrangement overcomes this problem by providing a centralized last number dialed table in the telephone switching system processor, which table records, on a per line basis, the last number dialed by a subscriber accessing that line. The number stored in the last number dialed table is retrieved by a subscriber subsequently going off-hook on the selected line and then operating the REDIAL key on the station set. The system processor retrieves the number stored in the last number dialed table associated with the selected line and completes a call connection to the destination identified by the retrieved number. The subject arrangement thereby provides an automatic redialing capability on a per line basis for all lines in the telephone switching system. Thus, multi-line station sets (including the attendant console) have automatic redialing capability for each line appearance on the multi-line station set.

BRIEF DESCRIPTION OF THE DRAWING

FIG. 2 illustrates in flow chart form the operational steps taken by the telephone switching system processor to provide the automatic redialing function.

DETAILED DESCRIPTION

Figure 1:
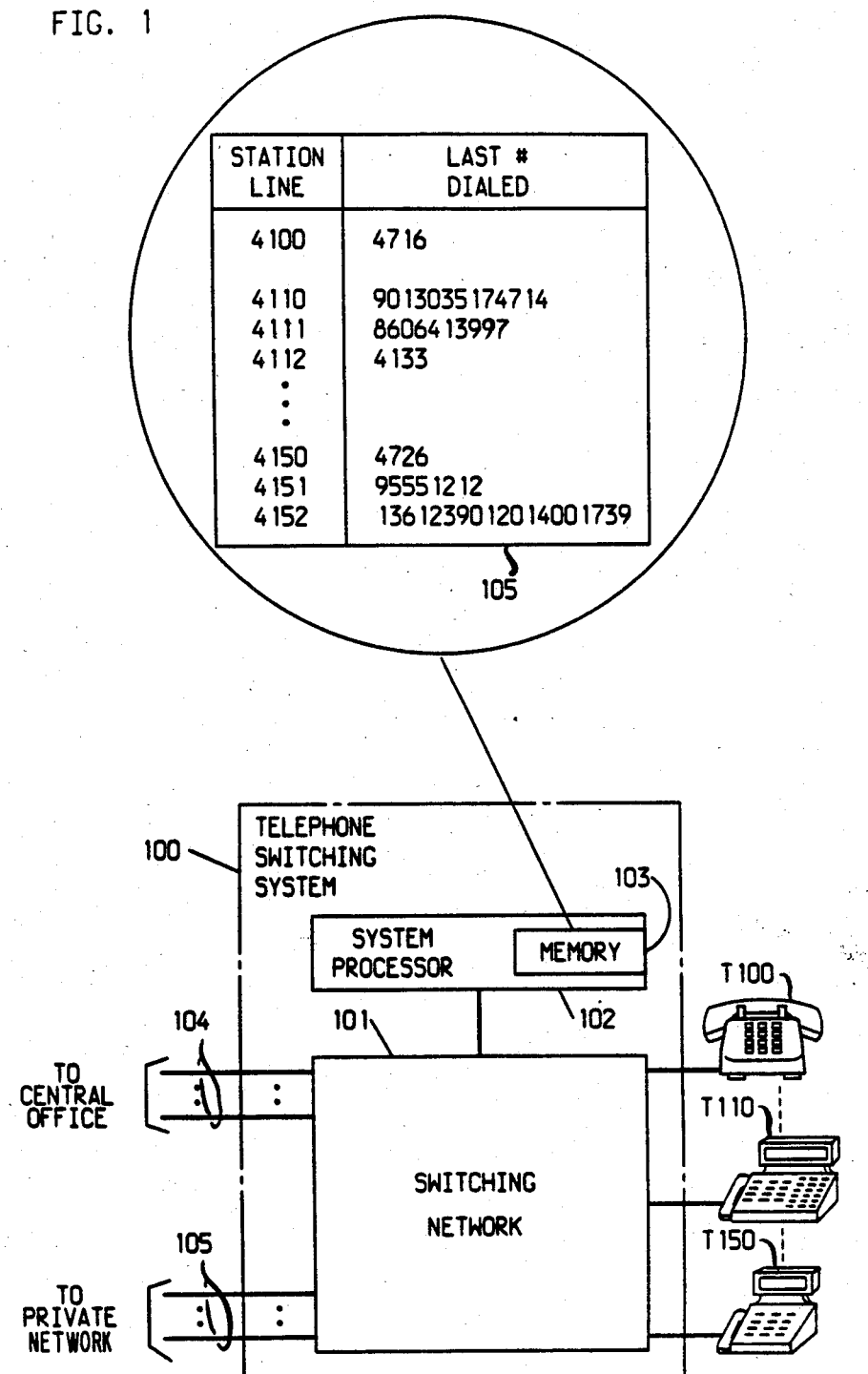
FIG. 1 illustrates the telephone switching system and its corresponding last number dialed table which is part of the system processor memory.

The subject automatic redialing arrangement and the telephone switching system of which it is a part is shown in block diagram form in FIG. 1. Telephone switching system 100 includes a switching network 101 which establishes voice communication connections in well known fashion among central office trunks 104, private line trunks 105 and various station apparatus such as: analog telephone station set T100, attendant console T110 and multi-line telephone station set T150. Telephone switching system 100 is a conventional stored program controlled system which operates under control of system processor 102. System processor 102 includes various call processing subroutines which are well known in the art and a memory 103 which is part of the subject automatic redialing arrangement.

Memory 103 contains a table of last number dialed entries which are illustrated in table 105. As can be seen from FIG. 1, the entries in table 105 provide a correspondence beween each station line in the telephone switching system and the last number dialed by the last subscriber to access that station line. Table 105 contains various entries including PBX station numbers, common carrier long distance telephone numbers and private network telephone numbers. The use of this table and its entries will be explained in greater detail in the following discussion of FIG. 2.

Telephone switching system 100 operates under control of a number of standard call processing subroutines and, for the purpose of this description, call processing examples are described in reference to attendant console T110 which contains a number of line appearances and an electronic readout. To illustrate the operation of this invention assume that the attendant at attendant console T110 has gone off-hook and has operated one of the line keys (example- 4110) which are served by attendant console T110. The method of operation illustrated in FIG. 2 begins with operation 201 where system processor 102 responds to the activation of a line key (for call origination) or the answer key (for an incoming call) by the attendant at attendant console T110. System processor 102 responds to this key operation by advancing to operation 202 which displays the last number dialed on this accessed line (4110). This is accomplished by system processor 102 using the station identification number (4110) of the line accessed by the attendant to address memory 103. As can be seen from table 105, the entry in memory 103 corresponding to the address 4110 is a common carrier long distance number (01-303-517-4714), includng the preface digit 9 to access an outgoing trunk. System processor 102 retrieves this last dialed number and transmits same to attendant console T110 over a control communication channel as is well known in the art. This retrieved last number dialed is received by attendant console T110 and displayed on the electronic readout which is part of attendant console T110.

Start Key - New Number Dialed

The attendant can respond to the displayed last number dialed in one of two ways. Operation 203 on FIG. 2 indicates that the attendant can elect to operate either the START key or the REDIAL key on attendant console T110. If the START key is operated, a message is transmitted by attendant console T110 to system processor 102 to indicate this operation. System processor 102 responds to this message by performing operation 204 which clears the retrieved last number dialed from address location 4110 in memory 103. System processor 102 then begins operation 205 which stores each digit dialed by the attendant on this line in memory 103 at address location 4110 while concurrently transmitting the dialed digits to attendant console T110 where the dialed digits are displayed on the electronic readout. These operations (204,205) store a newly dialed number for subsequent retrieval by the attendant the next time the attendant accesses line 4110.

Radial Key - Automatic Redialing

If the attendant elected to operate the REDIAL key on attendant console T110, a redial message is transmitted by attendant console T110 to system processor 102. In response to this redial message, system processor 102 performs operation 206 which retrieves the first digit from the memory location in memory 103 associated with line 4110. In this case, the first digit stored in memory location 4110 is a 9 which indicates a request for access to a common carrier line via a central office trunk 104. System processor 102 loads this access code (9) into a digit register in operation 207 and interprets the loaded access code in operation 208 to determine the type of call requested. In this example, system processor 102 proceeds to operation 210 since a trunk access code (9) was the access code loaded into the digit register. In operation 210, system processor 102 seizes one of outgoing central office trunks 104 then proceeds to operation 211 where the remainder of the table entry (01-303-517-4714) associated with station line 4110 is loaded into the digit register. System processor 102 proceeds with operation 212 to enable the transmission of the stored number onto the seized central office trunk. System processor 102 then follows the standard telephone switching system trunk call processing routine to complete the call to the indicated destination by outpulsing the retrieved number on the central office trunk.

Station-to-Station Call

As can be seen from FIG. 2, a trunk call is just one of a number of types of calls that can be completed using the automatic redialing feature. If the attendant had accessed station line 4112, as can be seen from table 105, a PBX station code is stored in the last number dialed portion of memory 103 associated with line 4112. System processor 102 in performing operation 207 loads the entire station number (4133) into the digit register since this is an intercom call. In operation 208 system processor 102 identifies this as a station call and simply branches to the standard attendant-to-station call processing routine to complete this call to extension 4133 since a complete dialed number is stored in the digit register.

Billing/Authorization Codes

There are two other possibilities that are worth discussing here and those are billing numbers associated with toll calls and authorization codes for automatic route selection. An example of the latter can be seen by the entry in table 105 associated with station line 4111. Here a private line access line number is stored along with a corresponding authorization code. The first digit stored in memory 103 at memory location 4111 is an 8 which indicates to system processor 102 that access is requested to one of private network trunks 105. The lead digit (8) is followed by a seven digit dial code (6064139) which indicates the identity of the destination station on this private network. All of these digits are loaded into the digit register by system processor 102 during operation 207 as described above. System processor 102 in determining the type of call in operation 208 would identify this as a private network call based upon the first digit being an 8. System processor 102 then performs operation 209 which retrieves additional digits from memory location 4111, which digits (97) are the authorization code to permit attendant console T110 to make use of this private network. System processor 102 now has a complete set of data stored in the digit register: access code (8), destination identification number (6064139) and authorization code (97). System processor 102 now processes the call to completion following the standard private network call processing routine.

The last example is similar to the private network case and involves a subscriber entering a billing number prior to the dialing of a long distance number. This is a common feature on telephone switching systems where the billing equipment provided on telephone switching system 100 records the identity of the calling party, the called party and an account number which indicates the customer account to which this call is billed. This operation is illustrated by reviewing the case where a subscriber at multi-line telephone station set T150 goes off hook on line number 4152. The entry on table 105 corresponding to line 4152 is a three digit access code, followed by a three digit account charge code, followed by a trunk access digit 9 followed by a long distance number of 01+10 digits. System processor 102 during operation 208 determines from the first digit retrieved from memory 103 that a station user is accessing a long distance line and the call charge is to be billed to a designated account. System processor 102 performs operation 215 which retrieves three digit access code (136) and the three digit billing code (123) from the memory location in memory 103 corresponding to the accessed line 4152. This retrieved account code is stored in the digit register in operation 215. System processor 102 proceeds to operation 216 and retrieves the next digit (9) stored in line 4152 digit storage area. System processor 102 advances to operation 207 where this retrieved digit is loaded into the digit register (207) and the call type (trunk) is determined (208). The call processing proceeds as described above where the trunk call is completed using the standard trunk call processing routine.

As can be seen from these examples, the subject automatic redialing feature provides a per line last number dialed memory so that subscribers at multi-line station sets as well as the attendant can automatically redial the last number dialed on any particular line by simply operating the redial key on the station set.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the scope and the spirit of the invention.

What is claimed is:

1. In a telephone switching system having a plurality of trunk and port circuits each of which are connected to an associated communication device via a communication line for interfacing said communication device to said telephone switching system, wherein said telephone switching system includes a switching network for interconnecting said trunk and port circuits, an automatic redialing apparatus comprising:

means responsive to the dialing of a number at any of one or more of said communication devices for storing said dialed number in a memory location associated with the communication line on which said number was dialed;

means responsive to said communication device next accessing said communication line and generating a last number dialed request signal for automatically establishing a call connection from said communication device to the destination identified by said dialed number.

2. The system of claim 1 wherein said establishing means includes:

means responsive to said dialed number for activating said switching network to establish a call connection through said switching network from said port circuit associated with said communication device to said identified destination.

3. The system of claim 1 wherein said establishing means includes:

means responsive to said communication device next accessing said communication line for retrieving said dialed number from said memory location associated with said communication line;

means responsive to said retrieving means for displaying said dialed number on said communication device; and means responsive to said last number dialed request signal for automatically establishing a call connection from said communication device to the said destination identified by said dialed number.

4. The system of claim 2 or 3 wherein said establishing means further includes:

means responsive to said switching network connection where said destination is one of said trunk circuits for outpulsing said dialed number on said trunk circuit.

5. The system of claim 1 wherein said storing means is responsive to said dialing for recording an account billing code in addition to said dialed number identifying said destination.

6. The system of claim 1 wherein said storing means is responsive to said dialing for recording an access authorization code in addition to said dialed number identifying said destination.

7. The system of claim 1 wherein said telephone switching system includes a system processor for controlling the operation of said telephone system, said storing means includes:

memory means in said system processor for recording said dialed number for each of said communication devices.

8. In a telephone switching system having a plurality of trunk circuits and port circuits each of which connects an associated communication device to a switching network, which switching network establishes communication connections between said trunk and port circuits, a method of automatically dialing the last number dialed by any of said communication devices comprising the steps of:

storing the dialed digits from each communication device in a memory location corresponding to the line appearance on which the communication device is presently active;

establishing a call connection between said communication device and said destination identified by said dialed digits when said communication device is subsequently accessed and a last number dialed request signal is generated by said communication device.

9. The method of claim 8 wherein the step of establishing includes the step of:

activating said switching network to establish a call connection through said switching network from said line appearance associated with said communication device to said destination identified by said dialed digits.

10. The method of claim 9 wherein the step of establishing includes the steps of:

retrieving said dialed digits from said memory location corresponding to line appearance associated with said communication device;

displaying said dialed digits on said communication device; and activating said switching network to establish a call connection from said line appearance associated with said communication device to said destination identified by said dialed digits in response to said last number dialed request signal.

11. The method of claim 9 or 10 wherein the step of activating includes the step of:

transmitting said stored digits on said line appearance in response to said call connection when said destination is a trunk circuit.

12. The method of claim 11 wherein said step of storing includes the step of:

recording an account billing code in addition to said dialed digits which identify said destination.

13. The method of claim 11 wherein the step of storing includes the step of:

recording an access authorization code in addition to said dialed digits which identify said destination.

14. In a telephone switching system having a switching network, a control processor for controlling the operation of said telephone switching system, an attendant console connected to both said switching network and said processor, wherein said attendant console is equipped with a plurality of line appearances, and automatic redialing arrangement comprising:

means in said processor responsive to the attendant originating a call on any of said plurality of line appearances for storing the dialed digits in a memory location corresponding to said one line appearance;

means responsive to said attendant next accessing said one line appearance and activating a radial request button on said attendant console for establishing a call connection from said one line appearance to the destination identified by said dialed digits.

15. The system of claim 14 wherein said establishing means includes:

means responsive to said attendant next accessing said one line appearance for retrieving said dialed digits from said storing means memory location corresponding to said one line appearance;

means responsive to said retrieved dialed digits for displaying said retrieved dialed digits on said attendant console; and means responsive to said activated radial request button for activating said switching network to establish a call connection through said switching network from said one line appearance to said destination identified by said dialed digits.

16. In a telephone switching system having a switching network with a number of line and trunk appearances, a plurality of communication devices, one or more of which have more than one line appearance, a switching network for interconnecting said trunk and line appearances, an automatic redialing apparatus comprising: means responsive to the dialing of a number at one of said one or more communication devices for storing said dialed number in a memory location associated with the line appearance on which said one communication device is active; means responsive to said one communication device next accessing said line appearance and generating a last number dialed request signal for automatically establishing a call connection from said line appearance to the destination identified by said dialed number.

17. The system of claim 16 wherein said establishing means includes:

means responsive to said dialed number for activating said switching network to establish a switching network connection from said line appearance to said destination.

18. The system of claim 16 wherein said establishing means includes:

means responsive to said one communication device next accessing said line appearance for retrieving said dialed number from said memory location associated with said line appearance;

means responsive to said retrieving means for displaying said dialed number on said one communication device; and means responsive to the generation of said last number dialed request signal for establishing a switching network connection from said line appearance to said destination.

* * * * *